US011785422B2

(12) United States Patent
Lee et al.

(10) Patent No.: US 11,785,422 B2
(45) Date of Patent: Oct. 10, 2023

(54) AUTOMATIC CONNECTION AND DISCONNECTION SYSTEM AND AUTOMATIC CONNECTION AND DISCONNECTION METHOD

(71) Applicant: Optoma Corporation, New Taipei (TW)

(72) Inventors: Hsuan-Meng Lee, Hsin-Chu (TW); Kang-Lun Fan, Hsin-Chu (TW)

(73) Assignee: Optoma Corporation, New Taipei (TW)

( * ) Notice: Subject to any disclaimer, the term of this patent is extended or adjusted under 35 U.S.C. 154(b) by 0 days.

(21) Appl. No.: 17/338,681

(22) Filed: Jun. 4, 2021

(65) Prior Publication Data

US 2021/0392464 A1 Dec. 16, 2021

(30) Foreign Application Priority Data

Jun. 12, 2020 (CN) .......................... 202010533377.9

(51) Int. Cl.
*H04W 4/029* (2018.01)
*H04W 4/02* (2018.01)
(Continued)

(52) U.S. Cl.
CPC .......... *H04W 4/029* (2018.02); *H04B 17/318* (2015.01); *H04W 4/021* (2013.01);
(Continued)

(58) Field of Classification Search
CPC ..... H04W 48/04; H04W 4/029; H04W 12/08; H04W 4/02; H04W 64/00; H04W 12/64;
(Continued)

(56) References Cited

U.S. PATENT DOCUMENTS 6,760,599 B1 7/2004 Uhlik
9,473,901 B1* 10/2016 White ..................... H04W 4/80
(Continued)

FOREIGN PATENT DOCUMENTS

CN 105554861 5/2016
CN 107786942 3/2018
(Continued)

OTHER PUBLICATIONS

"Office Action of Taiwan Counterpart Application", dated Oct. 18, 2021, p. 1-p. 3.
(Continued)

*Primary Examiner* — Dung Hong
(74) *Attorney, Agent, or Firm* — JCIPRNET

(57) ABSTRACT

An automatic connection and disconnection system and an automatic connection and disconnection method are provided. The method includes the following steps. A connection signal sent by an electronic device is received by a determining device. The connection signal includes intensity information obtained from measuring at least three identification signals by the electronic device. The at least three identification signals are from at least three peripheral devices, and the at least three peripheral devices are placed to form a geographical region. Also, a first position of the electronic device is located by the determining device according to the connection signal. Next, whether the first position is within the geographical region is determined by the determining device. When the first position is within the geographical region, the electronic device is communicatively connected to a connecting device. The connecting device is located within or outside the geographical region.

10 Claims, 6 Drawing Sheets

(51) Int. Cl.
- *H04W 76/30* (2018.01)
- *H04W 76/11* (2018.01)
- *H04B 17/318* (2015.01)
- *H04W 4/021* (2018.01)

(52) U.S. Cl.
CPC ............ *H04W 4/023* (2013.01); *H04W 76/11* (2018.02); *H04W 76/30* (2018.02)

(58) Field of Classification Search
CPC ... H04W 64/003; H04W 48/08; H04W 76/30; H04W 76/11; H04W 4/021; H04W 4/023; H04L 63/107; H04B 17/318
See application file for complete search history.

(56) References Cited

U.S. PATENT DOCUMENTS

| | | | | |
|---|---|---|---|---|
| 2004/0203908 A1* | 10/2004 | Hind | ................ | H04W 64/00 455/411 |
| 2004/0203910 A1* | 10/2004 | Hind | ................ | H04W 48/04 455/67.11 |
| 2012/0044863 A1* | 2/2012 | Huang | ................ | H04W 84/12 370/328 |
| 2016/0249162 A1 | 8/2016 | Mayuzumi et al. | | |
| 2016/0275794 A1* | 9/2016 | Chang | ................ | G08G 1/144 |
| 2016/0337940 A1* | 11/2016 | Ahuja | ................ | H04W 4/021 |
| 2018/0063154 A1* | 3/2018 | Gullicksen | ......... | H04L 63/0227 |
| 2018/0139569 A1* | 5/2018 | Padgett | ................ | G07C 9/28 |
| 2021/0014234 A1* | 1/2021 | Kwatra | ................ | H04L 63/102 |

FOREIGN PATENT DOCUMENTS

| | | |
|---|---|---|
| CN | 108012265 | 5/2018 |
| CN | 108055558 | 5/2018 |
| CN | 108076427 | 5/2018 |
| TW | 201210398 | 3/2012 |
| TW | 201336336 | 9/2013 |

OTHER PUBLICATIONS

"Office Action of China Counterpart Application", dated Apr. 20, 2023, p. 1-p. 11.

* cited by examiner

AUTOMATIC CONNECTION AND DISCONNECTION SYSTEM AND AUTOMATIC CONNECTION AND DISCONNECTION METHOD

CROSS-REFERENCE TO RELATED APPLICATION

This application claims the priority benefit of Chinese application serial no. 202010533377.9, filed on Jun. 12, 2020. The entirety of the above-mentioned patent application is hereby incorporated by reference herein and made a part of this specification.

BACKGROUND

Technical Field

The disclosure relates to a network connection mechanism. In particular, the disclosure relates to an automatic network connection and disconnection system and an automatic connection and disconnection method.

Description of Related Art

In the existing automatic network connection and disconnection technology, for example, in a scenario shown in FIG. 1A, a connecting device 110 (e.g., a wireless projector) and an electronic device 130 (e.g., a notebook computer) are located within different spaces. The electronic device 130 is, for example, located outside a space R such as a conference room, and the connecting device 110 is located within the space R. When a user 199 is operating the electronic device 130 and approaching the space R, since the connecting device 110 and the electronic device 130 are relatively close, an intensity of a connection signal from the connecting device 110 received by the electronic device 130 is relatively strong, and therefore the electronic device 130 may automatically establish a connection with the connecting device 110. However, it may be that the user 199 is merely passing by the conference room and is not looking forward to a connection established between the electronic device 130 and the connecting device 110. In a scenario shown in FIG. 1B, the electronic device 130 is located within a space R1, a connecting device 111 is located within the space R1, and the connecting device 110 may be located within or outside a space R2. The space R1 and the space R2 may, for example, be two adjacent conference rooms. When the user 199 carries the electronic device 130 and enters the space R1, for example, the user 199 intends to establish a connection between the electronic device 130 and the connecting device 111. However, since the connecting device 110 located within or outside the space R2 is closer to the electronic device 130 than the connecting device 111 is, an intensity of a signal from the connecting device 110 received by the electronic device 130 is stronger than that of the connecting device 111, and therefore, the electronic device 130 may establish a connection with the connecting device 110. Thus, an error may occur, causing inconvenience to the user 199.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an automatic connection and disconnection system and an automatic connection and disconnection method, which can be used to solve the above technical problems, so that a user can more accurately establish a connection between an electronic device and a connecting device.

In the embodiments of the disclosure, an automatic connection and disconnection system is provided. The automatic connection and disconnection system includes at least three peripheral devices, a connecting device, and a determining device. The peripheral devices are placed to form a geographical region, and the peripheral devices send identification signals. The connecting device is located within the geographical region or outside the geographical region. The determining device is configured to locate a first position of an electronic device according to a connection signal when receiving the connection signal sent by the electronic device, and determine whether the first position is in the geographical region. The connection signal includes intensity information obtained from measuring each of the identification signals by the electronic device. The determining device communicatively connects the electronic device with the connecting device when the first position is in the geographical region.

In the disclosure, an automatic connection and disconnection method is provided. The automatic connection and disconnection method includes the following steps. Firstly, a connection signal sent by an electronic device is received by a determining device, where the connection signal includes intensity information obtained from measuring at least three identification signals by the electronic device. The at least three identification signals are from at least three peripheral devices, and the at least three peripheral devices are placed to form a geographical region. Also, the determining device locates a first position of the electronic device according to the connection signal. Next, the determining device determines whether the first position is within the geographical region by the determining device. When the first position is located within the geographical region, the determining device communicatively connects the electronic device with a connecting device. The connecting device is located within or outside the geographical region.

Based on the foregoing, the automatic connection and disconnection system and method in the embodiments of the disclosure effectively avoid erroneous connections between the electronic device and the connecting device.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical contents, features, and effects of the disclosure will be clearly presented in the following detailed description of a preferred embodiment with reference to the accompanying drawings. The directional terms mentioned herein, such as "above", "below", "front", "back", "left", "right", and the like, refer only to the directions in the accompanying drawings. Therefore, the directional terms are used for explaining instead of limiting the disclosure.

Figure 2:
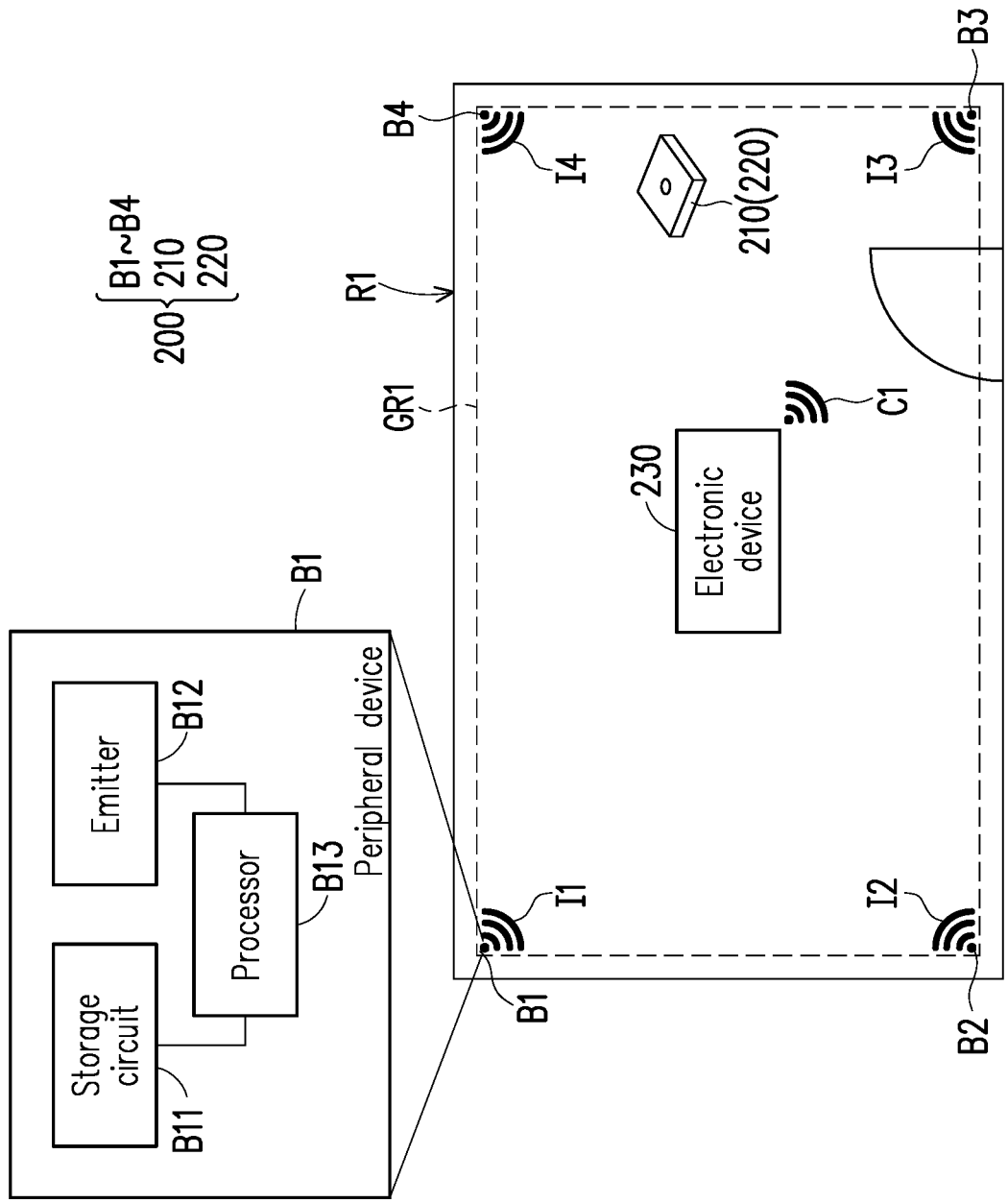
FIG. 2 is a schematic diagram of an application scenario according to an embodiment of the disclosure.

FIG. 2 is a schematic diagram of an application scenario according to an embodiment of the disclosure. In FIG. 2, for example, an automatic connection and disconnection system 200 may include four peripheral devices B1-B4, a connecting device 210, and a determining device 220. In the embodiment shown in FIG. 2, the determining device 220 may be disposed in the connecting device 210, and the connecting device 210 and the peripheral devices B1-B4 may all be disposed within a space R1 (e.g., a conference room). However, in other embodiments, the determining device 220 may also be disposed independently of the connecting device 210. For example, the determining device 220 may be disposed in the electronic device 230 including such as various smart devices or computer devices. The disclosure does not limit the manner in which the determining device 220 is disposed.

In an embodiment of the disclosure, the determining device 220 may include a processor, such as a central processing unit (CPU) or any other programmable general-purpose or special-purpose microprocessor, a programmable controller, an application specific integrated circuit (ASIC), a programmable logic device (PLD), or any other similar device or a combination of thereof, configured to calculate data and output determination results. However, the disclosure is not limited thereto. The connecting device 210 is, for example, a projector, which may include a light source, a light valve, a projection lens, among other components, and may be configured to connect to various electronic devices and project the required projection contents according to the electronic device connected, but is not limited thereto.

In this embodiment, the peripheral devices B1-B4 may be placed to form a geographical region GR1, and the peripheral devices B1-B4 respectively send identification signals I1-I4. In some embodiments, the geographical region GR1 may roughly correspond to the outline of the space R1, but the disclosure is not limited thereto. In other embodiments, designers, depending on requirements, may place the peripheral devices B1-B4 to form geographical regions as required. Specifically, the geographical region GR1 may overlap with the space R1, or the geographical region GR1 may be slightly larger than the space R1, and is not limited to the aspect shown in FIG. 2. In addition, as shown in FIG. 2, the connecting device 210 in this embodiment may be disposed within the geographical region GR1, but is not limited thereto. For example, in a case where the geographical region GR1 is smaller than the space R1, the connecting device 210 may as well be located outside the geographical region GR1 and within the space R1.

Figure 1A:
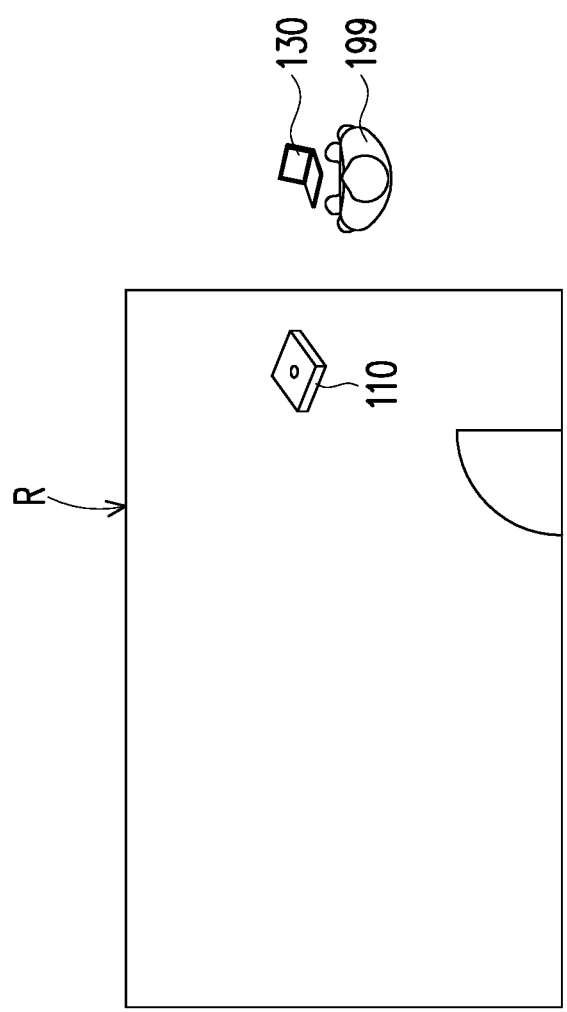
FIGS. 1A-1B are schematic diagrams of scenarios of known erroneous connections.
Figure 1B:
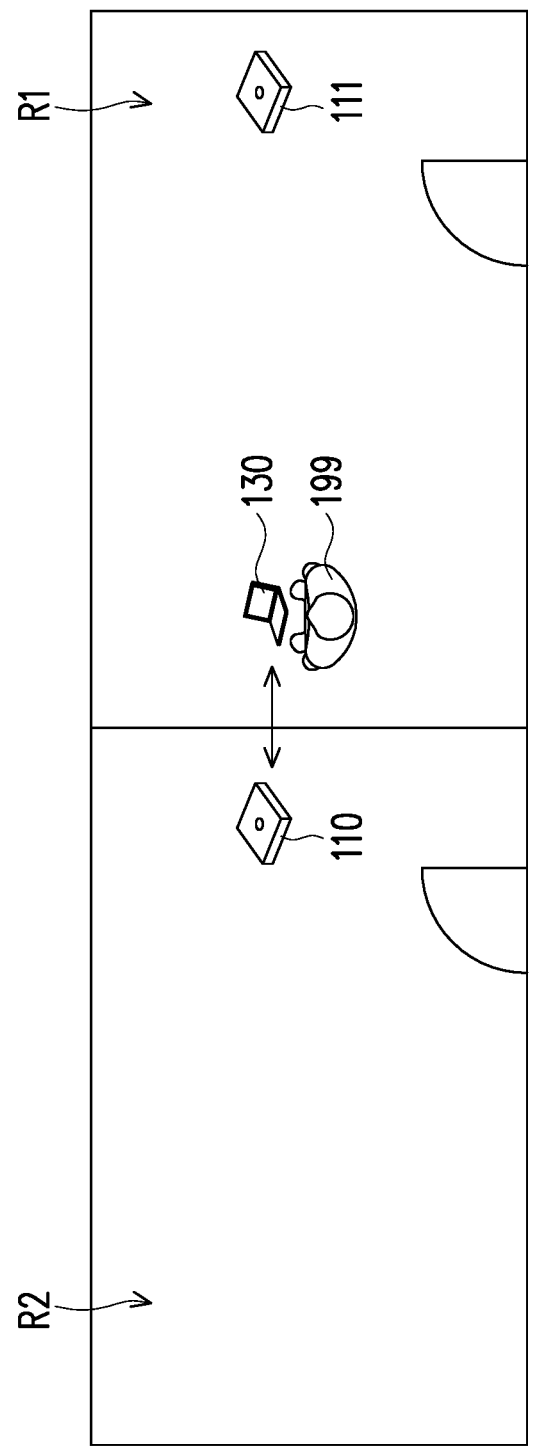

Through the technical solutions proposed by the disclosure, when entering the space R1, the electronic device 230 (e.g., a notebook computer, a mobile phone, etc.) automatically establishes a connection with the connecting device 210 which is likewise located within the space R1. In this way, the erroneous connections shown in FIGS. 1A and 1B can be avoided.

In addition, the peripheral devices B1-B4 may be associated with the connecting device 210. For example, relevant personnel may preconfigure the peripheral devices B1-B4 and the connecting device 210 as devices adapted for the space R1, and record relevant configuration information and association information in the peripheral devices B1-B4, the connecting device 210 and/or the determining device 220. However, the disclosure is not limited thereto.

In some embodiments, in order to define the geographical region GR1 as required, relevant personnel may place the peripheral devices B1-B4 in a sequence from B1 to B4, so that the peripheral devices B1-B4 are sequentially connected to form the geographical region GR1. Moreover, the peripheral devices B1-B4 may be first, second, third, and fourth peripheral devices, and the geographical region GR1 may be formed by connecting the peripheral devices B1-B4 in a numbering sequence, but the disclosure is not limited thereto. For example, in an embodiment where the automatic connection and disconnection system includes three peripheral devices, the three peripheral devices include a first peripheral device, a second peripheral device, and a third peripheral device, and the geographical region GR1 in this embodiment may be formed by connecting the first peripheral device, the second peripheral device, and the third peripheral device in a numbering sequence.

In some embodiments, the peripheral devices B1-B4 respectively send the identification signals I1-I4. The identification signals I1-I4 may be adopted for the determining device 220 to accordingly locate a position (e.g., a first position) of the electronic device 210. Relevant details will be described subsequently. In an embodiment, the peripheral devices B1-B4 may form a first device group, and the identification signals I1-I4 may form a first signal group.

In some embodiments, the peripheral devices B1-B4 may have the same structure. The peripheral device B1, as an example, may include a storage circuit B11, an emitter B12, and a processor B13. In addition, the storage circuit B11 may be configured to store association information between the first device group (e.g., including the peripheral devices B1-B4) and the connecting device 210. In different embodiments, the storage circuit B11, for example, may include any type of fixed or portable random access memory (RAM), read-only memory (ROM), flash memory, hard disk, or other similar devices or a combination thereof, and may be configured to record multiple program codes or modules. Moreover, the emitter B12 may include, for example, a wireless communication module/circuit for emitting the identification signal I1, but is not limited thereto. Furthermore, the processor B13 may be coupled to the storage circuit B11 and the emitter B12, and control the emitter B12 to send the identification signal I1. In different embodiments, the processor B13 may include a general-purpose processor, a specific-purpose processor, a traditional processor, a digital signal processor, a plurality of microprocessors, one or more microprocessors combined with a digital signal processor core, a controller, a microcontroller, an application specific integrated circuit (ASIC), a field programmable gate array (FPGA), any other kind of integrated circuit, state machine, and processor based on Advanced RISC Machine (ARM), and the like. However, the disclosure is not limited thereto.

In an embodiment of the disclosure, the electronic device 230, the peripheral devices B1-B4, and/or the connecting device 210 may support a wireless communication protocol to achieve signal transmission and wireless connection. The wireless communication protocol include, for example, Bluetooth, infrared, Wi-Fi, etc., but is not limited thereto. Further, a Wi-Fi Protected Setup (WPS) button may be disposed on the electronic device 230. The peripheral devices B1-B4 are, for example, wireless network base stations.

In an embodiment of the disclosure, the peripheral devices B1-B4, the connecting device 210, and the determining device 220 may work together to realize the automatic connection and disconnection method proposed by the disclosure. The details are described below.

Figure 3:
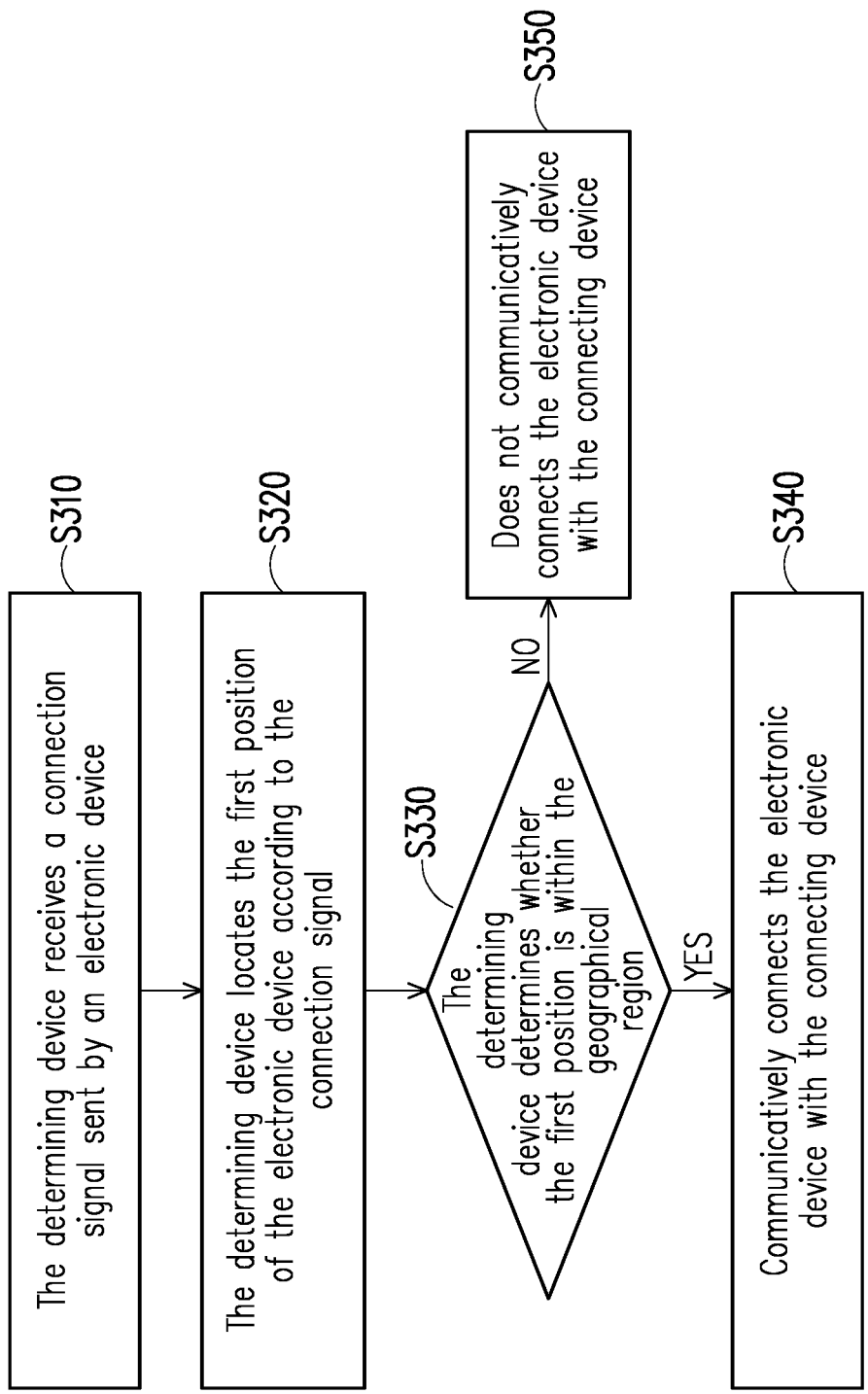
FIG. 3 is a flowchart of the automatic connection and disconnection method according to an embodiment of the disclosure.

FIG. 3 is a flowchart of the automatic connection and disconnection method according to an embodiment of the disclosure. The method in this embodiment can be executed by the automatic connection and disconnection system 200 shown in FIG. 2. Steps shown in FIG. 3 are each described below with reference to the content of FIG. 2.

In step S310, the determining device 220 receives a connection signal C1 sent by the electronic device 230. In an embodiment, if the user intends to connect the electronic device 230 to the connecting device 210, the user may activate a connection function of the electronic device 230 (e.g., by pressing the WPS button disposed on the electronic device 230), so that the electronic device 230 sends the connection signal C1. The connection signal C1 may be adopted as a request signal to request to establish a connection with the connecting device 210, but is not limited thereto. In this case, it can be avoided that the electronic device 230 attempts to establish a connection with the connecting device 210 when the user is not in the know. However, the disclosure is not limited thereto. In another embodiment, the electronic device 230 measures the identification signals I1-I4 from the peripheral devices B1-B4, and then analyzes intensities of the identification signals I1-I4 to obtain intensity information of each of the identification signals I1-I4. The connection signal C1 sent by the electronic device 230 may include the intensity information of each of the identification signals I1-I4.

In step S320, the determining device 220 locates the first position of the electronic device 230 according to the connection signal C1. In an embodiment, since the connection signal C1 includes the intensity information of each of the identification signals I1-I4, the determining device 220 can locate the first position of the electronic device 230 through a method of triangulation.

To be specific, the peripheral devices B1-B4 may be configured to respectively emit the identification signals I1-I4 at default power. After receiving the identification signals I1-I4, the electronic device 230 can measure and obtain the intensity information of the identification signals I1-I4. In this case, when the determining device 220 obtains the intensity information of the identification signals I1-I4 measured by the electronic device 230 from the connection signal C1, the determining device 220 can calculate a distance between the electronic device 230 and each of the peripheral devices B1-B4 according to a degree of attenuation of each of the identification signals I1-I4, to thereby obtain the first position of the electronic device 230 through the method of triangulation, but the disclosure is not limited thereto.

In step S330, the determining device 220 determines whether the first position is within the geographical region GR1. If the result is in the affirmative, then in step S340, the determining device 220 accordingly communicatively connects the electronic device 230 and the connecting device 210. If the result is in the negative, the in step S350, the determining device 220 accordingly does not communicatively connect the electronic device 230 and the connecting device 210.

In some embodiments, in step S340, after being connected to the connecting device 210, the electronic device 230 may still continually receive the identification signals I1-I4 and continually measure and obtain the intensity information each of the identification signals I1-I4 for the determining device 220 to locate the first position of the electronic device 230. In an embodiment, when the determining device 220 determines that the first position of the electronic device 230 is not located within the geographical region GR1, the determining device 220 may communicatively disconnect the electronic device 230 from the connecting device 210. Thereby, when a user 299 (shown in FIG. 4) carries the electronic device 230 away from the geographical region GR1, the connection between the electronic device 230 and the connecting device 210 can be disconnected, further increasing the convenience of use.

Figure 4:
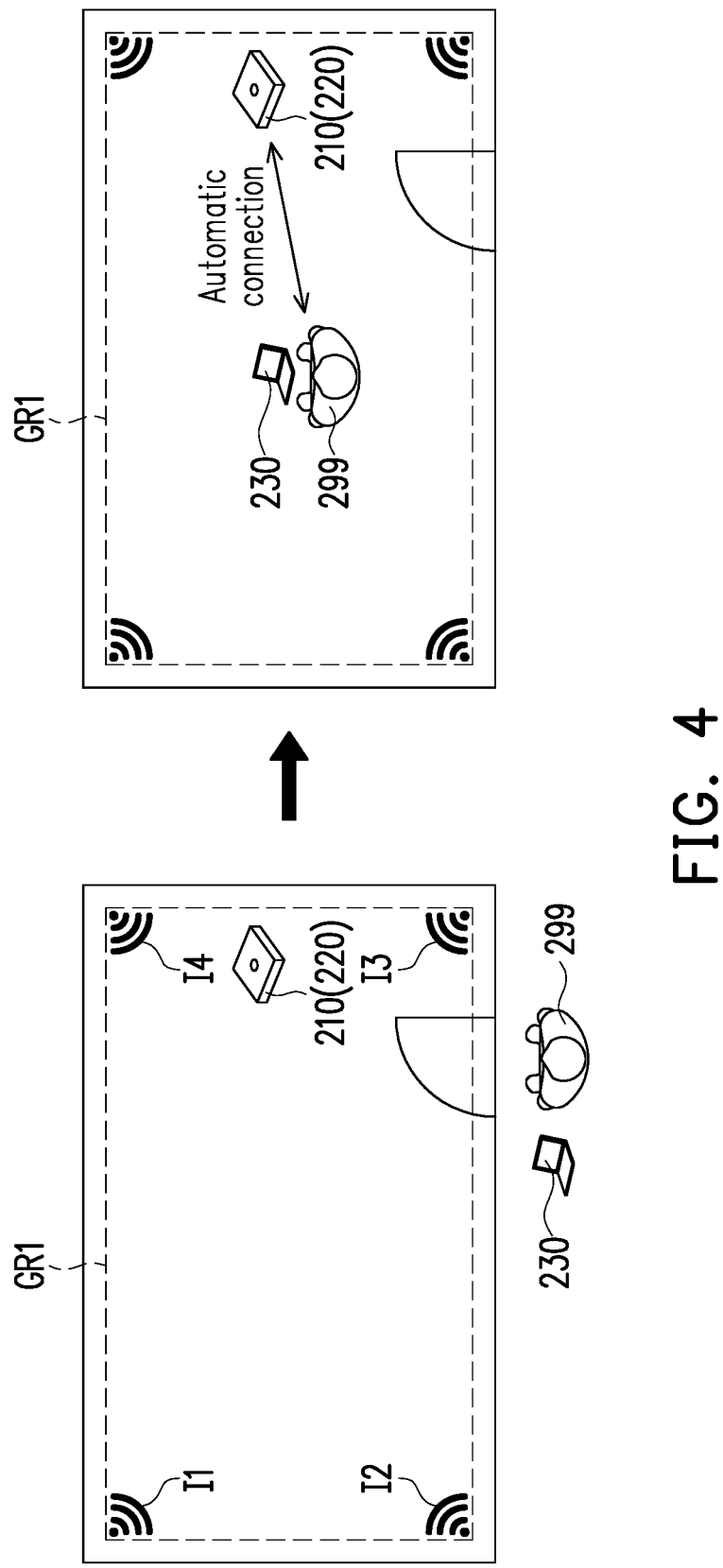
FIG. 4 is a schematic diagram of the automatic connection mechanism shown in FIG. 2.

In order for the above conception to be easier to comprehend, description will be made below with the assistance of FIG. 4 and FIG. 5. FIG. 4 is a schematic diagram of the automatic connection mechanism shown in FIG. 2. In FIG. 4, as shown at the left, when the user 299 carries the electronic device 230 and enters the geographical region GR1, the determining device 220 can determine that the electronic device 230 has entered the geographical region GR1 according to the intensity information of the identification signals I1-I4 provided by the electronic device 230. In this case, as shown at the right, the determining device 220 can accordingly establish a connection between the electronic device 230 and the connecting device 210, so that the electronic device 230 can control the connecting device 210 to perform projection and the like.

Figure 5:
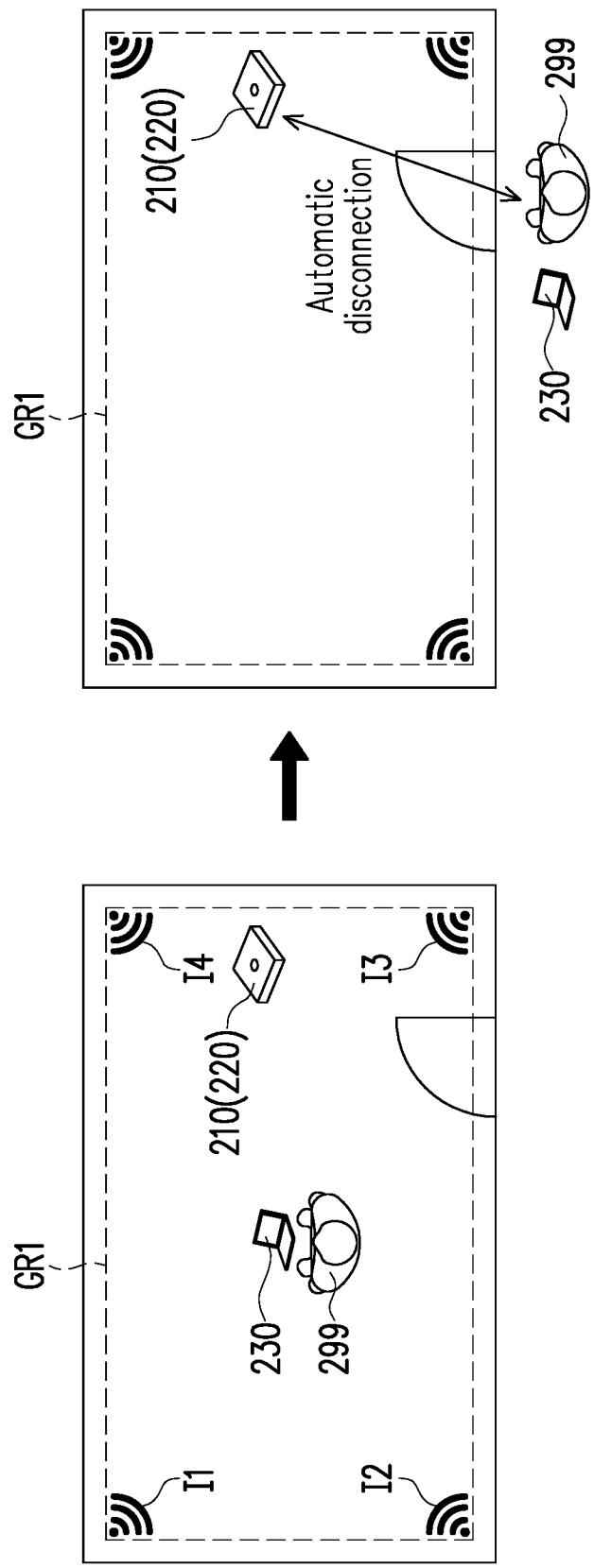
FIG. 5 is a schematic diagram of the automatic disconnection mechanism shown in FIG. 2.

FIG. 5 is a schematic diagram of the automatic disconnection mechanism shown in FIG. 2. In FIG. 5, as shown at the left, when the user 299 carries the electronic device 230 and intends to leave the geographical region GR1, the determining device 220 can determine that the electronic device 230 has left the geographical region GR1 according to the intensity information of the identification signals I1-I4 provided by the electronic device 230. In this case, as shown at the right, the determining device 220 can accordingly disconnect the connection between the electronic device 230 and the connecting device 210.

It should be understood that in the above embodiments, the determining device 220 is disposed in the connecting device 210. However, in other embodiments, the determining device 220 may also be disposed in the electronic device 230, and the determining device 220 can still operate according to the teaching in the foregoing embodiments. For example, after the electronic device 230 measures the intensity information of the identification signals I1-I4, the intensity information of each of the identification signals I1-I4 may be correspondingly transmitted or fed back to the determining device 220 disposed in the electronic device 230, so that the determining device 220 can accordingly locate the first position of the electronic device 230. Moreover, when the determining device 220 determines that the first position of the electronic device 230 is located within the geographical region GR1 formed by the peripheral devices B1-B4, the determining device 220 may control the electronic device 230 to connect to the connecting device 210 preconfigured as associated with the peripheral devices B1-B4, so that the electronic device 230 can control the connecting device 210 to perform operations such as projection. However, the disclosure is not limited thereto.

Furthermore, although a number of four peripheral devices are employed as an example for description in the above embodiments, it may be possible that only three peripheral devices are provided in other embodiments. In the case where three peripheral devices are provided, the peripheral devices may be connected to form the only triangular geographical region, and thus a default number is not necessary for each of the interface devices, but the disclosure is not limited thereto.

In summary of the foregoing, the determining device of the disclosure can locate the first position of the electronic device according to the intensity information of each of the identification signals measured by the electronic device. When it is determined that the first position is located within the geographical region formed by the peripheral devices, a connection between the electronic device and the connecting device is established, in which the connecting device is associated with the peripheral devices. In this way, the electronic device can be more correctly connected to the connecting device as required, such as a connecting device that belongs to the same space/geographical region as the electronic device, so that it is prevented that the electronic device is erroneously connected to connecting devices, such as a connecting device in the adjacent conference room, which are geographically closer to but have no association with the peripheral devices. Moreover, when the determining device determines that the first position of the electronic device is no longer within the geographical region, the determining device can automatically disconnect the connection between the electronic device and the connecting device, thereby improving the convenience of use.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. In addition, the terms "first," "second," etc., mentioned in this specification or the claims are only used for naming elements or for distinguishing between different embodiments or scopes, instead of limiting the upper bound or the lower bound of the number of elements.

What is claimed is:

1. An automatic connection and disconnection system comprising at least three peripheral devices, a connecting device, and a determining device, wherein
    the at least three peripheral devices are placed to form a geographical region, and the at least three peripheral devices send at least three identification signals;
    the connecting device is located within the geographical region or outside the geographical region; and
    the determining device is configured to:
        locate a first position of an electronic device according to a connection signal when receiving the connection signal sent by the electronic device, wherein the connection signal comprises intensity information obtained from measuring each of the identification signals by the electronic device; and
    determine whether the first position is in the geographical region, wherein the determining device communicatively connects the electronic device with the connecting device when the first position is in the geographical region, wherein the at least three peripheral devices comprise a first peripheral device, a second peripheral device, and a third peripheral device, and the geographical region is formed by connecting the first peripheral device, the second peripheral device, and the third peripheral device in a numbering sequence.

2. The automatic connection and disconnection system according to claim 1, wherein the determining device is disposed in the connecting device or the electronic device.

3. The automatic connection and disconnection system according to claim 1, wherein the determining device is configured to locate the first position of the electronic device based on the intensity information of each of the identification signals through performing a triangulation method.

4. The automatic connection and disconnection system according to claim 1, wherein the determining device is further configured to communicatively disconnect the electronic device from the connecting device when the first position of the electronic device is no longer located within the geographical region.

5. An automatic connection and disconnection system comprising at least three peripheral devices, a connecting device, and a determining device, wherein
the at least three peripheral devices are placed to form a geographical region, and the at least three peripheral devices send at least three identification signals;
the connecting device is located within the geographical region or outside the geographical region; and
the determining device is configured to:
locate a first position of an electronic device according to a connection signal when receiving the connection signal sent by the electronic device, wherein the connection signal comprises intensity information obtained from measuring each of the identification signals by the electronic device; and
determine whether the first position is in the geographical region, wherein the determining device communicatively connects the electronic device with the connecting device when the first position is in the geographical region, wherein the at least three peripheral devices form a first device group, and the at least three identification signals form a first signal group, and each of the peripheral devices comprises an emitter, a storage circuit, and a processor, wherein
the storage circuit is configured to store association information between the first device group and the connecting device; and
the processor is coupled to the emitter and the storage circuit, and is configured to control the emitter to send the identification signal.

6. An automatic connection and disconnection method comprising:
receiving a connection signal sent by an electronic device by a determining device, wherein the connection signal comprises intensity information obtained from measuring at least three identification signals by the electronic device, wherein the at least three identification signals are from at least three peripheral devices, and the at least three peripheral devices are placed to form a geographical region;
locating a first position of the electronic device by the determining device according to the connection signal; and
determining whether the first position is within the geographical region by the determining device, wherein when the first position is located within the geographical region, the determining device communicatively connects the electronic device with a connecting device, wherein the connecting device is located within the geographical region or outside the geographical region, wherein the at least three peripheral devices comprise a first peripheral device, a second peripheral device, and a third peripheral device, and the geographical region is formed by connecting the first peripheral device, the second peripheral device, and the third peripheral device in a numbering sequence.

7. The automatic connection and disconnection method according to claim 6, wherein the determining device is disposed in the connecting device or the electronic device.

8. The automatic connection and disconnection method according to claim 6, wherein the step of locating the first position of the electronic device comprises:
locating the first position of the electronic device by the determining device based on the intensity information of each of the identification signals through performing a triangulation method.

9. The automatic connection and disconnection method according to claim 6, further comprising:
communicatively disconnecting the electronic device from the connecting device when the first position of the electronic device is no longer located within the geographical region.

10. An automatic connection and disconnection method comprising:
receiving a connection signal sent by an electronic device by a determining device, wherein the connection signal comprises intensity information obtained from measuring at least three identification signals by the electronic device, wherein the at least three identification signals are from at least three peripheral devices, and the at least three peripheral devices are placed to form a geographical region;
locating a first position of the electronic device by the determining device according to the connection signal; and
determining whether the first position is within the geographical region by the determining device, wherein when the first position is located within the geographical region, the determining device communicatively connects the electronic device with a connecting device, wherein the connecting device is located within the geographical region or outside the geographical region, wherein the at least three identification signals form a first signal group, and each of the peripheral devices comprises an emitter, a storage circuit, and a processor, wherein
the storage circuit is configured to store association information between the first signal group and the connecting device; and
the processor is coupled to the emitter and the storage circuit, and is configured to control the emitter to send the identification signal.

* * * * *